Oct. 6, 1970 R. O. WINDER 3,532,991

SHIFT CIRCUITS INCLUDING THRESHOLD OR OTHER LOGIC GATES AND EMPLOYING MULTIPLE-PHASE SHIFT PULSES

Filed May 8, 1968 3 Sheets-Sheet 1

INVENTOR
ROBERT O. WINDER

BY Samuel Cohen

ATTORNEY

INVENTOR
ROBERT O. WINDER
BY Samuel Cohen
ATTORNEY

INVENTOR
ROBERT O. WINDER
BY Samuel Cohen
ATTORNEY

United States Patent Office 3,532,991

Patented Oct. 6, 1970

3,532,991

SHIFT CIRCUITS INCLUDING THRESHOLD OR OTHER LOGIC GATES AND EMPLOYING MULTIPLE-PHASE SHIFT PULSES

Robert O. Winder, Princeton, N.J., assignor to RCA Corporation, a corporation of Delaware Filed May 8, 1968, Ser. No. 727,557
Int. Cl. H03k 23/00
U.S. Cl. 328—37 18 Claims

ABSTRACT OF THE DISCLOSURE

Shift circuits such as ring counters employing threshold or other logic gates which produce, at adjacent stages, pulses in time sequence which slightly overlap and which produce, at alternate stages, pulses in time sequence which do not overlap. Multiple-phases are employed for shifting the stored information.

SUMMARY OF THE INVENTION

The circuits of the invention include $n$ stages. Two timing signals of different phase are applied to said stages. There is also applied to at least each stage after the first and second stages signals indicative of the state of that stage and signals indicative of the states of the two preceding stages.

DETAILED DESCRIPTION

Figure 1:
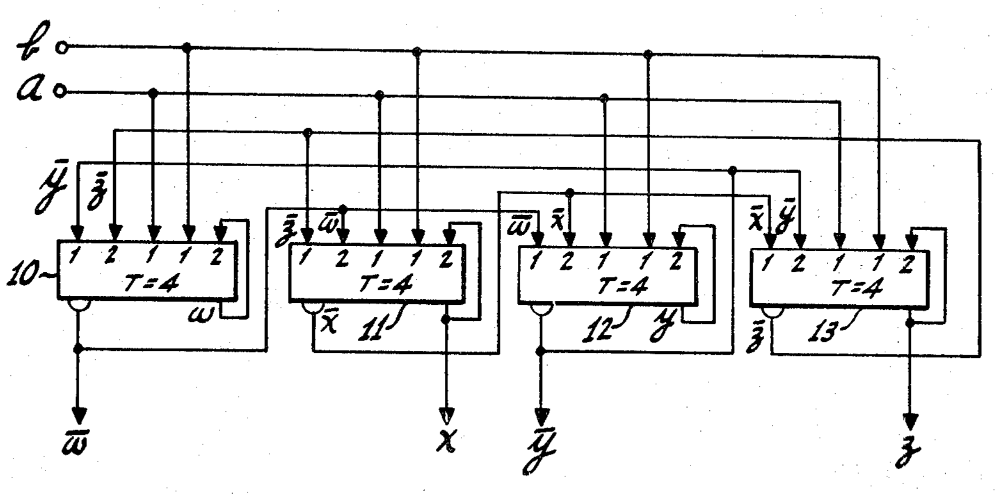
FIG. 1 is a block diagram of one form of ring counter according to the invention.

The gates of FIG. 1 receive electrical signals which represent binary digits (bits) as inputs, and produce electrical signals which represent bits as outputs. To simplify the discussion which follows, the bits themselves are sometimes referred to rather than the signals which represent the bits.

The threshold gates shown in FIG. 1 are, in themselves, known. Each gate has a threshold T of four, has a total of seven input weights, and produces a normal and a complemented output. For example, the gate 10 produces a normal output $w$ and a complemented output $\overline{w}$. The numbers across the top of each block of FIG. 1 represent the weights accorded the respective inputs. Thus, for example, in gate 10 the signal $\overline{z}$ which is applied to a weight 2 terminal has twice the effect on the operation of the gate as the signal $\overline{y}$, or the signal $a$. The term threshold of four implies that if four or more of the input weights represent the bit 1, the normal output of the gate represents a 1 and the complemented output represents a 0; if less than four of the input weights represent the bit 1, the normal output of the gate represents a 0 and the complemented output represents a 1.

Circuits for gates of the general type shown in FIG. 1, are described in copending application, Threshold Gates and Circuit, Ser. No. 567,344 filed July 13, 1966, now Pat.

No. 3,487,316, by the present applicant and assigned to the same assignee as the present application.

The storage circuits of the present invention may be operated in open-loop fashion as shift registers or counters or may have feedback from the later to the earlier stages and operate as ring counters. In the former applications, the circuits may have any number, odd or even, of stages. When operated as ring counters, they must have an even number $n$ of stages. For purposes of the present application, the various embodiments are illustrated as ring counters. The example chosen for illustration in FIG. 1 has four stages, 10–13 and the information present in the stages is shifted by overlapping, multiple-phase shift pulses $a$ and $b$.

In the circuit of FIG. 1, the normal output of each gate is applied back to the same gate with weight 2. The complementary output of each gate is applied to the next adjacent gate forward with weight 2 and is applied also to the gate two stages forward with weight 1. The shift pulses $a$ and $b$ are both applied to each stage with weight 1.

In more mathematical terms, the circuit of FIG. 1 can be described as follows:

(1) The normal output $x_j$ of the $j^{th}$ gate is applied to the $j^{th}$ gate with weight 2.

(2) The complementary output $\overline{x}_j$ of the $j^{th}$ gate is applied to the $$j \underset{n}{\oplus} 1^{th}$$

gate with weight 2, and to the $$j \underset{n}{\oplus} 2^{nd}$$

gate with weight 1.

(3) A shift wave of one phase is applied with weight 1 to all gates.

(4) A shift wave of a different phase which represents binary 1 during a period which overlaps the period the first shift wave represents binary 1 is applied to all gates with weight 1.

The symbols above have the following meanings:

$$\underset{n}{\oplus}$$

represents modulo $n$ addition; $j$ refers to each gate of the counter.

The operation of the circuit of FIG. 1 is succinctly given in Table I below. In this table, the symbol $S_w$ refers to the sum of the weights of the inputs of value 1 which are applied to the gate producing the output $w$ and so on. The asterisks are employed to indicate a change in the value of an output of a gate.

TABLE I

| $a$ | $b$ | $w$ | $S_w$ | $x$ | $S_x$ | $y$ | $S_y$ | $z$ | $S_z$ |
|---|---|---|---|---|---|---|---|---|---|
| 0 | 1 | 1 | 4 | 0 | 1 | 0 | 3 | 1 | 6 |
| 1 | 1 | 1 | 4 | 0 | 2 | 1* | 6 | 1 | 5 |
| 1 | 0 | 0* | 1 | 0 | 3 | 1 | 6 | 1 | 4 |
| 0 | 0 | 0 | 2 | 0 | 3 | 1 | 5 | 0* | 1 |
| 0 | 1 | 0 | 3 | 1* | 6 | 1 | 4 | 0 | 1 |
| 1 | 1 | 1* | 6 | 1 | 5 | 1 | 4 | 0 | 2 |
| 1 | 0 | 1 | 6 | 1 | 4 | 0* | 1 | 0 | 3 |
| 0 | 0 | 1 | 5 | 0* | 1 | 0 | 1 | 0 | 3 |
| 0 | 1 | 1 | 4 | 0 | 1 | 0 | 3 | 1* | 6 |

The discussion which follows shows by a number of examples, how the values above are arrived at. Assume first that the circuit is in the first state shown, that is $w\,x\,y\,z = 1\,0\,0\,1$. Assume also that $b=1$ and $a=0$. Of the signals applied to gate 12, those having the value 1, are $\overline{x}$ and $b$, so that the total number of input weights of value 1 is 3. Assume now that the shift wave $a$ changes its value from 0 to 1. This causes one additional input weight to gate 12 to become 1, so that the threshold $T=4$ of the gate is reached. The output of the gate therefore changes from 0 to 1, and since this output provides an input of weight 2, six of the input weights then represent a 1. At the same time, four of the input weights to gate 10 represent a 1. These are $w=1$, $a=1$ and $b=1$.

Assume now that the shift wave $b$ changes its value from 1 to 0. This causes only three of the input weights to gate 10 to have a value 1, so that the output $w$ of this gate changes from 1 to 0. The result is that only one of the input weights ($a=1$) to gate 10 now has the value 1.

Figure 2:
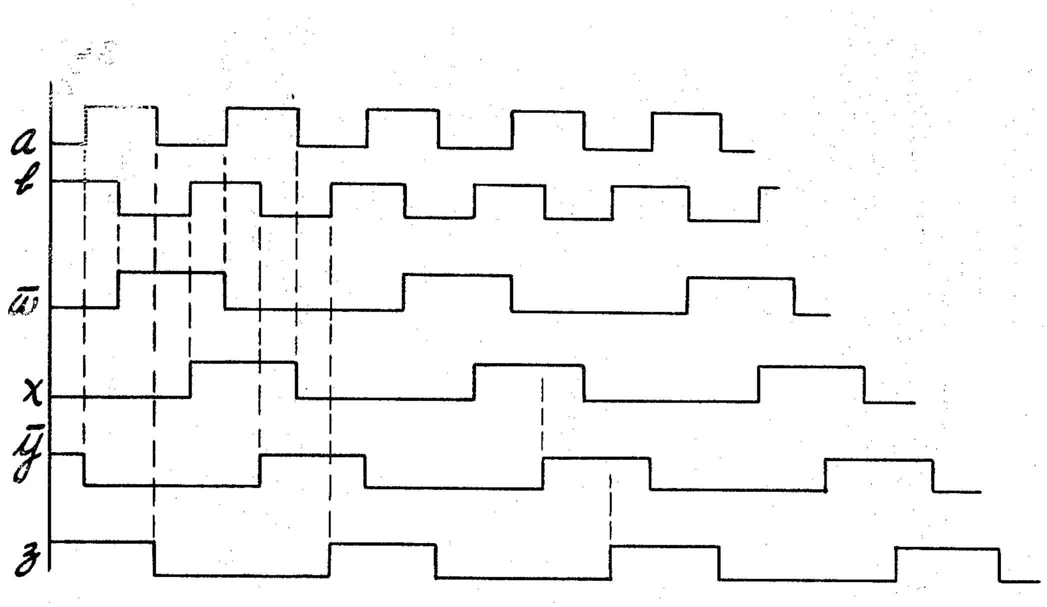
FIG. 2 is a drawing of waveforms present in the circuit of FIG. 1.

Analysis similar to the above can be made for each state of the counter of FIG. 1. These various states are illustrated in FIG. 2, where the relatively positive portion of each wave arbitrarily is chosen to represent the bit 1 and the relatively negative portion of each wave is chosen to represent the bit 0. For one particular application, the complementary signals produced by gates 10 and 12 and the normal signals produced by gates 11 and 13 may be employed as the output signals of the counter. With this choice, the singals of value 1 produced by adjacent stages of the counter slightly overlap and are in time sequence and the signals of value 1 produced by alternate stages of the counter do not overlap and are in time sequence.

Figure 3:
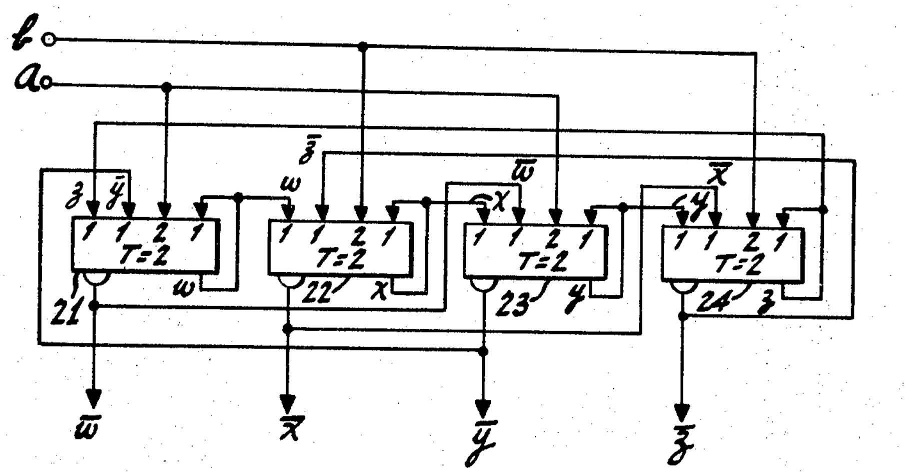
FIG. 3 is a block diagram of another form of ring counter according to the invention.
Figure 4:
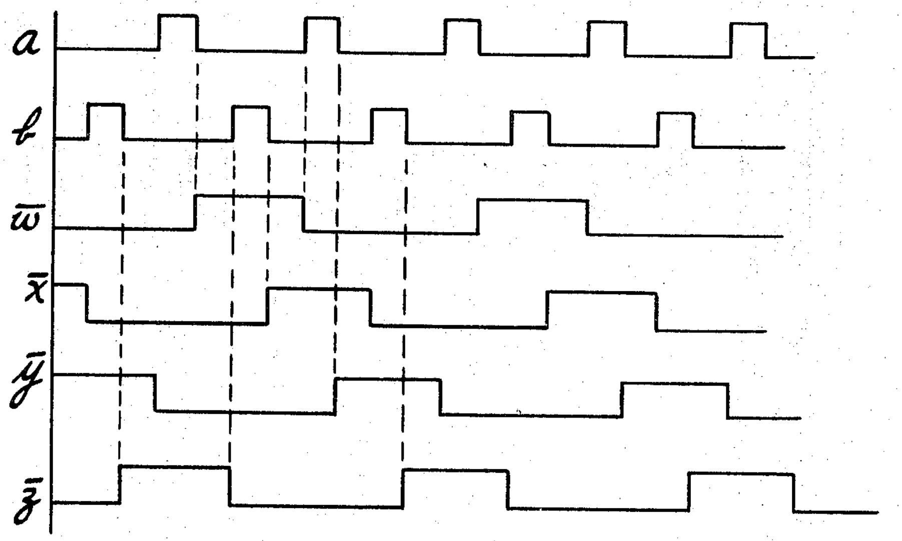
FIG. 4 is a drawing of waveforms present in the circuit of FIG. 3.

Another form of the invention is shown in FIG. 3. It has an even number $n$ of stages just as the circuit of FIG. 1 and, for purposes of the present application, $n$ is chosen to be four (stages 21–24). The gates each have a total of five input weights and a threshold of two. The normal output of each gate is applied back to the same gate with weight 1 and is applied to the next adjacent gate forward, also with weight 1. The complementary output of each gate is applied to the gate two stages forward with weight 1. A shift wave $a$ of one phase is applied to alternate stages 21 and 23 with weight 2, and a shift wave $b$ of another phase is applied to alternate stages 22 and 24, also with weight 2. The time during which the wave $a$ represents the binary value 1 is not concurrent with the time during which the wave $b$ represents the value 1, as is illustrated in FIG. 4. In this figure, as in the FIG. 2, it is assumed arbitrarily that the positive-going portions of the respective waves represent the bit 1 and the negative-going portions the bit 0.

In more mathematical terms, the circuit of FIG. 3 can be described as follows:

(1) The normal output $x_j$ of the $j^{th}$ gate is applied to the $j^{th}$ gate with the weight 1, and the $$\underset{n}{j \oplus 1}^{th}$$

gate with weight 1. The complementary output $\overline{x}_j$ of the $j^{th}$ gate is applied to the $$\underset{n}{j \oplus 2}^{nd}$$

gate with weight 1.

(2) The shift wave $a$ is applied to alternate gates with weight 2.

(3) The shift wave $b$ is applied to the remaining gates with weight 2.

The operation of the counter of FIG. 3 is succinctly given in Table II below.

TABLE II

| $a$ | $b$ | $w$ | $S_w$ | $x$ | $S_x$ | $y$ | $S_y$ | $z$ | $S_z$ |
|---|---|---|---|---|---|---|---|---|---|
| 0 | 0 | 1 | 3 | 0 | 1 | 0 | 0 | 1 | 2 |
| 0 | 1 | 1 | 3 | 1* | 4 | 0 | 1 | 1 | 3 |
| 0 | 0 | 1 | 2 | 1 | 3 | 0 | 1 | 0* | 0 |
| 1 | 0 | 1 | 3 | 1 | 3 | 1* | 4 | 0 | 1 |
| 0 | 0 | 0* | 0 | 1 | 2 | 1 | 3 | 0 | 1 |
| 0 | 1 | 0 | 1 | 1 | 3 | 1 | 3 | 1* | 4 |
| 0 | 0 | 0 | 1 | 0* | 0 | 1 | 2 | 1 | 3 |
| 1 | 0 | 1* | 4 | 0 | 1 | 1 | 3 | 1 | 3 |
| 0 | 0 | 1 | 3 | 0 | 1 | 0* | 0 | 1 | 2 |

The discussion which follows shows by a few examples how the values above are arrived at. Assume first that the circuit is in the first state shown, that is $wxyz=1001$, and $a=0$ and $b=0$. Assume now that shift wave $b$ changes its value to 1. Formerly, only one of the input weights to gate 22 had the value 1. Now three of the input weights have the value 1 and since the threshold of two of gate 22 is exceeded, $x$ changes its value to 1. Now four of the input weights to gate 22 have the value 1.

Assume now that $b$ changes its value to 0 and $a$ remains 0. Formerly three of the input weights to gate 24 represented the bit 1. The change in $b$ from 1 to 0 reduces the number of input weights of value 1 applied to gate 24 to 1 and this causes $z$ to change from 1 to 0. The result is that all of the input weights to gate 24 represent a 0.

Analyses similar to the above may be made for each state of the counter of FIG. 3. The operation of the counter is also illustrated in FIG. 4 where the complemented signals $\overline{w}\ \overline{x}\ \overline{y}\ \overline{z}$ are chosen as outputs.

Figure 6:
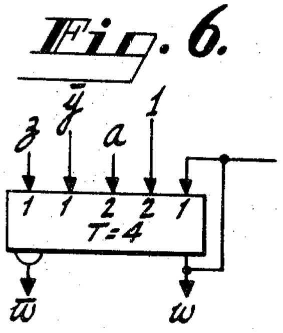
FIG. 6 is a sketch of a threshold gate which is the equivalent of the gates employed in the circuit of FIG. 3.

While the gates of FIG. 3 are illustrated as having input weights 2, 1, 1, 1, and having a threshold of two, it may be desirable, in some circumstances, to employ instead the equivalent gate shown in FIG. 6. This gate is a 2, 2, 1, 1, 1 gate which has a threshold of four and a constant bias representing the bit 1 applied to a weight 2 input terminal of the gate. So that the reader may more easily see the analogy, the equivalent of gate 21 is illustrated in FIG. 6.

An important feature of the circuit of FIG. 3 and of the circuit of FIG. 5 described below is the ease with which they may be reset. If $a$ and $b$ are both made equal to 1, then $\overline{w}$, $\overline{x}$, $\overline{y}$ and $\overline{z}$ all become equal to 0 in both circuits. Then, with $a=b=0$, any desired stage can be set to 1 by changing to 0 an input of present value 1.

Figure 5:
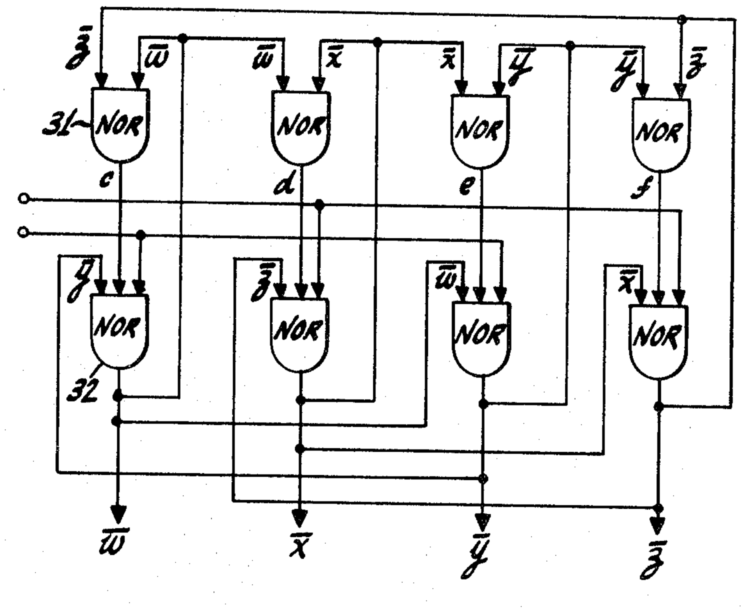
FIG. 5 is a block diagram of another form of ring counter according to the invention.

A third form of the present invention is illustrated in FIG. 5. This one has any even number of stages. For purposes of illustration, a counter with four such stages is shown. Each stage comprises two NOR gates such a 31 and 32. The output of each upper NOR gates serves as one input to the lower NOR gate. The output of each lower NOR gate is applied to the upper NOR gate of the same stage and the upper NOR gate of the next adjacent stage. The output of each lower NOR gate is also applied to the lower NOR gate of the stage two stages ahead. A shift wave $a$ of one phase is applied to the lower NOR gates of alternate stages and a shift wave $b$ of other phase is applied to the lower NOR gates of the remaining stages. These waves $a$ and $b$ are shown in FIG. 4.

In mathematical terms the circuit of FIG. 5 can be described in the following way. In this description, $uj$ refers to the upper NOR gate of the $j^{th}$ stage and $lj$ refers to the lower NOR gate of the $j^{th}$ stage.

(1) The output $\overline{x}_{lj}$ of the NOR gate $lj$ of each $j^{th}$ stage is applied to the NOR gate $uj$ of the $j^{th}$ stage and the NOR gate $$\underset{n}{uj \oplus 1}$$

of the $$\underset{n}{j \oplus 1}^{th}$$

stage. It is also applied to the NOR gate $$\underset{n}{lj \oplus 2}$$

of the $$\underset{n}{j \oplus 2}^{nd}$$

stage.

(2) The output of the NOR gate $uj$ of the $j^{th}$ stage is applied to the NOR gate $lj$ of the $j^{th}$ stage.

(3) The shift wave $a$ is applied to the lower NOR gates of alternate stages.

(4) The shift wave $b$ is applied to the lower NOR gate of the remaining stages.

(5) The waves $a$ and $b$ do not have the value 1 concurrently.

The operation of the circuit of FIG. 5 is succinctly given in Table III below. The waveforms are identical to those of FIG. 4.

TABLE III

| $a$ | $b$ | $\bar{w}$ | $\bar{x}$ | $\bar{y}$ | $\bar{z}$ | $c$ | $d$ | $e$ | $f$ |
|---|---|---|---|---|---|---|---|---|---|
| 0 | 0 | 0 | 1 | 1 | 0 | 1 | 0 | 0 | 0 |
| 0 | 1 | 0 | 0* | 1 | 0 | 1 | 1 | 0 | 0 |
| 0 | 0 | 0 | 0 | 1 | 1* | 0 | 1 | 0 | 0 |
| 1 | 0 | 0 | 0 | 0* | 1 | 0 | 1 | 1 | 0 |
| 0 | 0 | 1* | 0 | 0 | 1 | 0 | 0 | 1 | 0 |
| 0 | 1 | 1 | 0 | 0 | 0* | 0 | 0 | 1 | 1 |
| 0 | 0 | 1 | 1* | 0 | 0 | 0 | 0 | 0 | 1 |
| 1 | 0 | 0* | 1 | 0 | 0 | 1 | 0 | 0 | 1 |
| 0 | 0 | 0 | 1 | 1* | 0 | 1 | 0 | 0 | 0 |

In the operation of the circuit of FIG. 5, while each stage is not logically identical to the corresponding stage of the FIG. 3 circuit, they are the equivalent in these portions of their truth tables they are called upon to implement. Therefore, for purposes of the present application, they may be considered to be logically equivalent.

The equation which describes the operation of each stage $j$ of the circuit of FIG. 3 is:

$$x_j = Maj[1, 1, a, a, x_j, x_{j-1}, \bar{x}_{j-2}] \quad (1)$$

where:

$x_j$ is the input the $j^{th}$ stage receives from the $j^{th}$ stage and an output of the $j^{th}$ $x_{j-1}$ is the input the $j^{th}$ stage receives from the $$j \underset{n}{\ominus} 1^{th}$$

stage, where $$\underset{n}{\ominus}$$

represents modulo $n$ subtraction, $\bar{x}_{j-2}$ is the input of the $j^{th}$ stage receives from the $$j \underset{n}{\ominus} 2^{nd}$$

stage, and $a$ is assumed to be the shift pulse applied to the $j^{th}$ stage (the result is similar for $b$ substituted for $a$).

In Boolean terms, Equation 1 becomes:

$$x_j = a + x_j(x_{j-1} + \bar{x}_{j-2}) + x_{j-1}\bar{x}_{j-2} \quad (2)$$

$$\bar{x}_j = \bar{a}[\bar{x}_j(\bar{x}_{j-1} + x_{j-2}) + \bar{x}_{j-1}x_{j-2}] \quad (3)$$

The Boolean equation which defines the operation of each stage of the circuit of FIG. 5 is:

$$\bar{x}_j = \bar{a}x_{j-2}(\bar{x}_{j-1} + \bar{x}_j) \quad (4)$$

Equations 1 and 4 are not the same. Nevertheless, the following portion of their truth table is the same and it is this portion of the truth table which is involved in the operation of the circuits of FIGS. 3 and 5.

TABLE IV

| | $a$ | $x_{j-2}$ | $x_{j-1}$ | $p$ | $z_j$* |
|---|---|---|---|---|---|
| (1) | 1 | 0 | 1 | 1 | 1 |
| (2) | 0 | 0 | 1 | 1 | 1 |
| (3) | 0 | 1 | 1 | 1 | 1 |
| (4) | 0 | 1 | 0 | 1 | 1 |
| (5) | 1 | 1 | 0 | 1 | 1 |
| (6) | 1 | 0 | 0 | 1 | 1 |
| (7) | 0 | 0 | 0 | 1 | 0 |
| (8) | 0 | 0 | 0 | 0 | 0 |
| (9) | 0 | 0 | 1 | 0 | 0 |
| (10) | 1 | 0 | 1 | 0 | 1 |
| (11) | 1 | 0 | 1 | 1 | 1 |

In the table above $x_j$* represents the new value of the output of the $j^{th}$ stage, $\bar{x}_{j-2}$ represents the input applied to the $j^{th}$ stage by the $$j \underset{n}{\ominus} 2^{nd}$$

stage. $x_{j-1}$ represents the input applied to the $j^{th}$ stage by the $$j \underset{n}{\ominus} 1^{th}$$

stage. $p$ represents the present effective value of the signal fed back from the output of the $j^{th}$ stage to its input. Note that in FIG. 3, the normal output $x_j$ is fed back whereas in FIG. 5, the output $\bar{x}_j$ is fed back. However, in FIG. 5, the upper gate of the $j^{th}$ stage effectively inverts the fed back signal. For example, if $\bar{x}_j=1$ the output $x_{uj}$ of the upper gate $uj$ of the $j^{th}$ stage is 0. And, in those portions of the truth table of interest in the operation of the counter, if $\bar{x}_j=0$, then $x_{uj}=1$. Accordingly, the table is valid for both circuits.

The table above is more detailed then previous tables in that it includes some unstable circuit conditions. Thus, rows 2, 5, 7 and 10 represent transitory conditions of the circuit. Row 11 of the table is the same as row 1.

Figure 7:
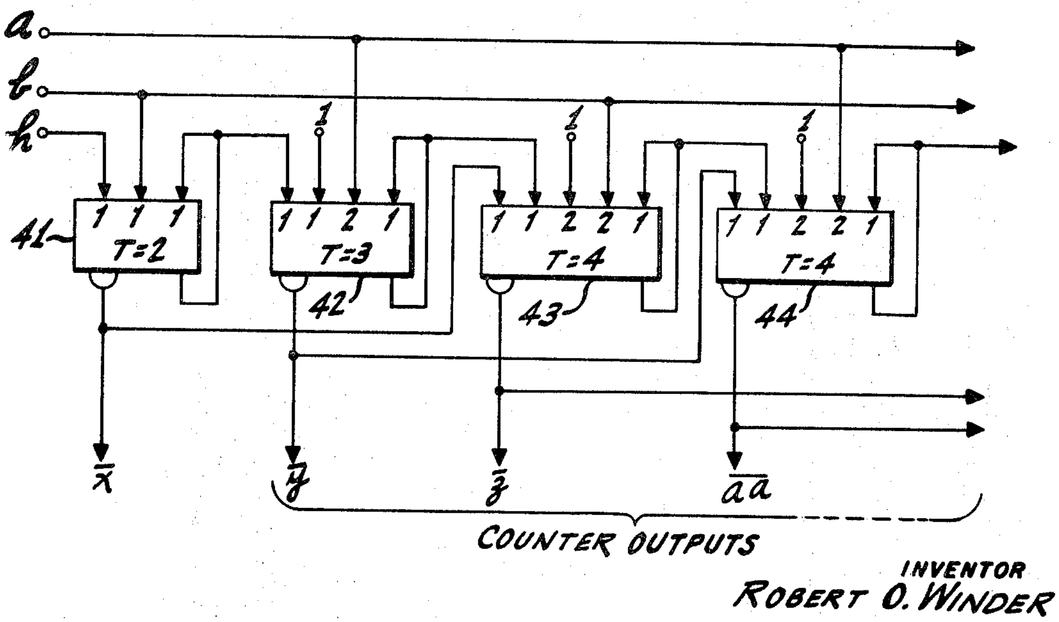
FIG. 7 is a block diagram of another form of shift circuit according to the invention.

In the introductory portion of this application, it is mentioned that the circuits of the present invention can be operated in open-loop fashion as well as in closed-loop, ring counter fashion. To illustrate how this may be accomplished, a modified form of the circuit of FIG. 3 is shown in FIG. 7. The first stage 41 of the circuit is a 3-input majority gate which receives a start pulse $h$, a shift pulse $b$ and a feedback pulse $x$. The second stage 42 is a threshold gate having a threshold of 3 and input weights 2, 1, 1, 1. The third, fourth and following stages of the counter are 2, 2, 1, 1, 1 gates with a threshold of 4. It is to be understood that there may be any number, odd or even, of such 2, 2, 1, 1, 1 gates and that only two of these gates are shown for purposes of the present application.

The counter of FIG. 7 operates in the following manner. First $a$ and $b$ are both made equal to 1 and $h$ is made equal to 1. This causes all of the outputs $\bar{x}$, $\bar{y}$, $\bar{z}$ and so on to be 0. Next $a$ and $b$ are both made equal to 0 and the start pulse $h$ is also made equal to 0. This causes $\bar{x}$ to have the value 1. The $x=0$ applied to gate 42 causes its output to change to $y=0$. $z$, $aa$, and so on remain equal to 1.

The start signal $h$ is now made equal to 1 again. $x$ remains of the same value, that is, $x=0$ (since $b$ and $x$ are 0). Now the shift pulses $a$ and $b$ start as in FIG. 4. However, the first shift pulse to assume the value 1 is the $b$ pulse. When $b$ changes to 1 during the time $h$ is 1, $x$ changes to 1. $y$ remains 0 and $a$ and $y=$. $Z$ and $aa$ remain equal to 1. Now, when $b$ changes back to 0 ($a$ is also 0) four of the 7-input weights to gate 43 are 0 ($y=0$, $\bar{x}=0$, $b=0$) so that $z$ becomes 0. Thereafter, the operation is exactly the same as the operation of the FIG. 3 circuit.

While not shown, it should be appreciated that the other circuits of the present application can be modified in the same general way as indicated in FIG. 7 to permit the circuits to operate in open-loop fashion.

While the invention has been illustrated in terms of ring counters with only four stages, it is to be understood that it is equally applicable to ring counters with greater even numbers of stages. Further, any output, complemented or normal, of any stage may serve as a counter output signal, the choice, in each case, depending upon engineering requirements. Finally, while a binary 1 is shown to correspond to a relatively positive signal the opposite convention may be chosen instead, that is, a 1 may be represented by a relatively negative signal and a 0 by a relatively positive signal.

What is claimed is:

1. A logic gate ring counter comprising, in combination:

an even number $n$ of logic gate means;

means for applying an output of each $j^{th}$ gate means back to the same gate means, where $j$ refers to each of the gate means;

means for applying an output of each $j^{th}$ gate means to the $$j \underset{n}{\oplus} 1^{th}$$

gate means, where $$\underset{n}{\oplus}$$

represents modulo $n$ addition;

means for applying an output of each $j^{th}$ gate means to the $$j \underset{n}{\oplus} 2^{nd}$$

gate means, where $$\underset{n}{\oplus}$$

represents modulo $n$ addition; and means for applying multiple-phase shift pulses to said gate means.

2. A logic gate ring counter as set forth in claim 1 wherein each gate means comprises a threshold gate of input weights 2, 2, 1, 1 and a threshold of four, and having a normal and a complemented output.

3. A logic gate ring counter as set forth in claim 2 wherein the normal output $x_j$ of each $j^{th}$ threshold gate is applied to the same gate with weight 2 and the complemented output $\overline{x}_j$ of each $j^{th}$ gate is applied to the $$j \underset{n}{\oplus} 1^{th}$$

gate with weight 2 and to the $$j \underset{n}{\oplus} 2^{nd}$$

gate with weight 1.

4. A logic gate ring counter as set forth in claim 3 wherein a shift pulse of one phase is applied to each threshold gate with weight 1 and a shift pulse of different phase is applied to each gate with weight 1, each shift pulse representing a binary 1 during a period which overlaps the period during which the other shift pulse represents a binary 1.

5. A logic gate ring counter as set forth in claim 1 wherein the normal output $x_j$ of each $j^{th}$ gate is applied to the same gate with weight 1 and is applied to the $$j \underset{n}{\oplus} 1^{th}$$

gate with weight 1 and wherein the complemented output $\overline{x}_j$ of each gate is applied to the $$j \underset{n}{\oplus} 2^{nd}$$

gate with weight 1, and further including means for applying a bias representing binary 1 with weight 2 to all gates.

6. A logic gate ring counter as set forth in claim 1 wherein a shift pulse of one phase is applied to alternate gates with weight 2 and a shift pulse of other phase is applied to the remaining gates with weight 2, said two shift pulses representing binary 1 during mutually exclusive periods.

7. A logic gate ring counter as set forth in claim 1 wherein each gate means comprises a pair of NOR gates.

8. A logic gate ring counter as set forth in claim 7 wherein the output of the first NOR gate of the $j^{th}$ pair of such gates is applied to the second NOR gate of the $j^{th}$ pair of such gates, and the output of the second NOR gate of the $j^{th}$ pair of such gates is applied to the first NOR gate of both the $j^{th}$ and the $$j \underset{n}{\oplus} 1^{th}$$

pair of such gates, and also to the second NOR gate of the $$j \underset{n}{\oplus} 2^{nd}$$

pair of such gates.

9. A logic gate ring counter as set forth in claim 8 wherein a shift pulse of one phase is applied to alternate second NOR gates and a shift pulse of other phase is applied to the remaining second NOR gates, said two shift pulses representing binary 1 during mutually exclusive periods.

10. A threshold gate ring counter comprising, in combination:

an even number $n$ of such threshold gates, each having a normal output and a complemented output;

means for applying the normal output of each gate to an input to the same gate;

means for applying the complemented output of each $j^{th}$ gate to at least the $$j \underset{n}{\oplus} 2^{nd}$$

gate and with weight 1 to the $$\underset{n}{\oplus}$$

gate, where $j$ refers to each gate and refers to modulo $n$ addition; and means for applying multiple-phase shift pulses to said gates.

11. A threshold gate ring counter as set forth in claim 10 wherein each threshold gate has input weights 2, 2, 1, 1, 1 and a threshold of four.

12. A threshold gate ring counter as set forth in claim 10 wherein each threshold gate has input weights 2, 1, 1, 1 and a threshold of 2.

13. A threshold gate ring counter as set forth in claim 11 wherein the normal output $x_j$ of the $j^{th}$ gate is applied with weight 2 to the $j^{th}$ gate, the complemented output $\overline{x}_j$ of the $j^{th}$ gate is applied with weight 2 to the $$j \underset{n}{\oplus} 1^{th}$$

gate and with weight 1 to the $$j \underset{n}{\oplus} 2^{nd}$$

gate, and wherein the multiple-phase shift pulses comprise a pulse train of one phase and a pulse train of a second phase and wherein both trains of pulses are applied to each gate.

14. A threshold gate ring counter as set forth in claim 12 wherein the normal output $x_j$ of the $j^{th}$ gate is applied both to the $j^{th}$ and the $$j \underset{n}{\oplus} 1^{th}$$

gate, both with weight 1, the complemented output of each $j^{th}$ gate is applied to the $$j \underset{n}{\oplus} 2^{nd}$$

gate with weight 1, and wherein there are two trains of shift pulses, each of different phase, one train of pulses being applied, with weight 2, to alternate gates and the other train of pulses being applied, with weight 2, to the remaining gates.

15. In a logic gate shift circuit, $n$ interconnected stages, where $n$ is an integer greater than two, the operation of each $j^{th}$ one of said stages being defined by the following truth table:

| $a$ | $x_{j-2}$ | $x_{j-1}$ | $p$ | $x_j^*$ |
|---|---|---|---|---|
| 1 | 0 | 1 | 1 | 1 |
| 0 | 0 | 1 | 1 | 1 |
| 0 | 1 | 1 | 1 | 1 |
| 0 | 1 | 0 | 1 | 1 |
| 1 | 1 | 0 | 1 | 1 |
| 1 | 0 | 0 | 1 | 1 |
| 0 | 0 | 0 | 1 | 0 |
| 0 | 0 | 0 | 0 | 0 |
| 0 | 0 | 1 | 0 | 0 |
| 1 | 0 | 1 | 0 | 1 |
| 1 | 0 | 1 | 1 | 1 |

where:

$a$ is a shift signal applied to the $j^{th}$ stage;

$\underline{x}_j$ is the new value of the output of the $j^{th}$ stage;

$\bar{x}_{j-2}$ is the input applied to the $j^{th}$ stage by the $j\ominus 2^{nd}$ stage;

$x_{j-1}$ is the input applied to the $j^{th}$ stage by the $j\ominus 1^{st}$ stage; and $p$ is the effective present value of the input applied to the $j^{th}$ stage by the $j^{th}$ stage.

16. A logic gate shift circuit comprising, in combination:

$n$ logic gate means, when $n$ is an integer greater than two;

means for applying an output of each $j^{th}$ gate means back to the same gate means, where $j$ refers to each of the gate means;

means for applying an output of each $j^{th}$ gate means to the $j+1^{th}$ gate means, when a $j+1^{th}$ gate is present;

means for applying an output of each $j^{th}$ gate means to the $j+2^{nd}$ gate means, when a $j+2^{nd}$ gate means is present; and means for applying multiple-phase shift pulses to said gate means.

17. A shift circuit comprising:

$n$ stages, where n is an integer greater than two;

means for applying to said stages two timing signals of different phase; and means for applying to at least each stage after the first and second stages, signals indicative of the state of that stage and signals indicative of the states of the two preceding stages.

18. A circuit as set forth in claim 16 wherein each such stage after the first and second stages is a 2, 2, 1, 1, 1 gate with a threshold of four.

References Cited

UNITED STATES PATENTS

| | | | |
|---|---|---|---|
| 3,234,401 | 2/1966 | Dinman | 307—211 X |
| 3,253,158 | 5/1966 | Horgan | 307—223 X |
| 3,456,126 | 7/1969 | Kaplan | 307—211 |

JOHN S. HEYMAN, Primary Examiner

S. D. MILLER, Assistant Examiner

U.S. Cl. X.R.

307—211, 221, 223; 328—43, 92

UNITED STATES PATENT OFFICE

CERTIFICATE OF CORRECTION

Patent No. 3,532,991 Dated October 6, 1970

Inventor(s) R. O. Winder

It is certified that error appears in the above-identified patent and that said Letters Patent are hereby corrected as shown below:

| | | |
|---|---|---|
| Column 5 | line 60 | "$x_{j-2}$" should be --$\overline{x}_{j-2}$-- |
| | | "$z_j$" should be --$x_j$-- |
| Column 7 | line 23 | "2, 2, 1, 1" should be --2, 2, 1, 1, 1-- |
| Column 8 | line 25 | Cancel the entire line |
| | lines 25-30 | Should read --gate, where j refers to each gate and $\Theta_n$-- |
| Column 9 | line 3 | "$x_{j-2}$" should be --$\overline{x}_{j-2}$-- |

Signed and sealed this 27th day of April 1971.

(SEAL)
Attest:

EDWARD M.FLETCHER,JR.
Attesting Officer

WILLIAM E. SCHUYLER, JR.
Commissioner of Patents